United States Patent
Matsumiya et al.

(10) Patent No.: US 6,812,850 B2
(45) Date of Patent: Nov. 2, 2004

(54) MEASURING APPARATUS

(75) Inventors: Sadayuki Matsumiya, Kawasaki (JP); Masanori Arai, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 125 days.

(21) Appl. No.: 10/226,527

(22) Filed: Aug. 23, 2002

(65) Prior Publication Data

US 2003/0043267 A1 Mar. 6, 2003

(30) Foreign Application Priority Data

Aug. 29, 2001 (JP) ........................................ 2001-259838

(51) Int. Cl.$^7$ .......................... G08B 21/00; G01B 3/16; G01B 5/00
(52) U.S. Cl. ................ 340/686.5; 340/686.1; 340/686.2; 340/686.6; 340/665; 33/558; 33/559; 33/561
(58) Field of Search .............................. 340/665, 686.1, 340/686.5, 686.2, 686.6; 33/558, 559, 561; 348/79, 80; 359/368, 379, 380, 381, 382, 383, 384; 318/286, 272, 273, 466–479, 445–446

(56) References Cited

U.S. PATENT DOCUMENTS

| | | | | |
|---|---|---|---|---|
| 3,945,124 A | * | 3/1976 | Jacoby et al. | 33/559 |
| 4,084,323 A | * | 4/1978 | McMurtry | 33/561 |
| 4,462,162 A | * | 7/1984 | McMurtry | 33/561 |
| 4,713,892 A | * | 12/1987 | Strauss | 33/559 |
| 4,720,922 A | * | 1/1988 | Strauss | 33/559 |
| 5,056,365 A | | 10/1991 | Gray et al. | |
| 5,339,535 A | * | 8/1994 | McMurtry et al. | 33/561 |
| 6,333,696 B1 | | 12/2001 | Matsumiya et al. | |
| 6,651,351 B1 | * | 11/2003 | Christoph et al. | 33/503 |

* cited by examiner

*Primary Examiner*—Jeffery Hofsass
*Assistant Examiner*—Lam Pham
(74) *Attorney, Agent, or Firm*—Rankin, Hill, Porter & Clark LLP

(57) ABSTRACT

The present invention has an object to provide a measuring apparatus which can surely prevent the collision of a moving member.

A measuring apparatus 10 comprises a moving member 18 which is moved to obtain information about a workpiece and might collide with the object 12, a moving device 20 for moving the moving member 18, and a protector 50 for preventing the moving member 18 from colliding with the object 12, the protector 50 including a protector body 52 provided in the moving member 18, a sensor 54 protruded from the protector body 52 by a predetermined length to come in contact such that a distance between the object 12 and the protector body 52 has a predetermined value or less and deformed elastically by a contact with the object 12, a strain detector 56 for detecting an amount of an elastic deformation of the sensor 54, and a controller 22 for stopping the relative movement of the moving member 18 by the moving device 20 or setting the relative movement in a reverse direction when the amount of the elastic deformation detected by the strain detector 56 exceeds a predetermined amount.

12 Claims, 5 Drawing Sheets

MEASURING APPARATUS

RELATED APPLICATIONS

This application claims the priority of Japanese Patent Application No. 2001-259838 filed on Aug. 29, 2001, which is incorporated herein by reference.

BACKGROUND OF THE INVENTION

1. Field of the Invention

The present invention relates to a measuring apparatus, and more particularly to a protecting mechanism which can surely prevent the collision of a moving member thereof.

2. Description of the Related Art

Conventionally, a measuring apparatus such as an image measuring apparatus for measuring the image of a measuring surface of a workpiece has often been used.

The image measuring apparatus comprises an image device for measuring the image of the scene on the measuring surface of a workpiece, a moving device for moving the image device, and a controller such as a driving circuit for controlling the operation of the moving device. The image device includes a CCD camera and a moving member such as an objective lens, and the moving member such as an objective lens is moved by the moving device in such a direction as to separate from or approach the measuring surface of the workpiece. The moving device is caused to move the objective lens by means of the controller in such a manner that the measuring surface of the workpiece is placed in the focal position of the objective lens, and the scene of the measuring surface of the workpiece or the like is measured by the image device.

In the measuring apparatus described above, for example, it is very important that the moving member such as an objective lens does not come in contact with an object such as a workpiece or a jig.

In the measuring apparatus described above, however, the moving member such as an objective lens is caused to collide with an object such as a workpiece, a jig or a measuring apparatus body due to a careless manipulation, the mistake of a part program or the like, for example. Consequently, there is a possibility that the workpiece, the objective lens, the measuring apparatus body or the like might be damaged, for example.

Then, it can be proposed that a protector for preventing the collision of the moving member described above is provided in the measuring apparatus.

However, a recent measuring apparatus hardly has an empty space due to a reduction in a size and space saving, and furthermore, an excessive empty space is hardly provided due to the installation of accessories or the like.

For this reason, conventionally, it is actually hard to newly provide a general large-scaled protector on the recent measuring apparatus and the development of any countermeasure for the prevention of a collision against the moving member has been required urgently.

SUMMARY OF THE INVENTION

The present invention has been made in consideration of the problems of the prior art and has an object to provide a measuring apparatus which can surely prevent the collision of a moving member.

In order to attain the object, the present invention provides a measuring apparatus comprising a moving member which is moved to obtain information about a workpiece and might collide with a certain object, a moving device for moving the moving member, and a protector for preventing the moving member from colliding with the object. The protector is characterized by a protector body, a sensor, a strain detector, and a controller.

The protector body is provided in a portion of the moving member in which a collision with the object is to be avoided.

Moreover, the sensor is protruded from the protector body by a predetermined length to come in contact such that a distance between the object and the protector body has a predetermined value or less, and is elastically deformed by a contact with the object.

The strain detector detects the amount of the elastic deformation of the sensor.

The controller stops the movement of the moving member by the moving device or sets the same movement in a reverse direction when the amount of the elastic deformation detected by the strain detector exceeds a predetermined amount.

Herein, the object has a possibility that the moving member might collide therewith, and optionally includes a workpiece and a measuring apparatus body, and furthermore, a jig present in the moving range of the moving member, a user and the like, for example.

Moreover, the information about the workpiece includes the shape, length, angle and scene of the measuring surface of the workpiece and the like, for example.

Examples of the strain detector according to the present invention include a strain gauge, piezo-electric element and the like.

In the present invention, there is provided an image device including an objective lens as the moving member and serving to measure the image of the measuring surface of the workpiece through the objective lens. The moving device moves at least the objective lens of the image device in a direction of an optical axis thereof. The controller moves at least the objective lens by the moving device such that the measuring surface of the workpiece is placed in a focal position of the objective lens. It is preferable that the sensor should be shorter than the focal length of the objective lens and should have such a predetermined length as to be protruded from a tip of the objective lens.

Herein, the movement of at least the objective lens in the direction of the optical axis includes the movement of the objective lens in the image device in the direction of the optical axis, and furthermore, movement in a direction other than the optical axis, for example, a direction orthogonal to the direction of the optical axis.

Furthermore, the movement of the objective lens includes the movement of the objective lens together with CCD camera in addition to the case in which only the objective lens is substantially moved.

In the present invention, moreover, it is also preferable that the sensor should include a plurality of projection members provided apart from each other along an outer periphery of the objective lens.

In the present invention, furthermore, the strain detector should be provided in the protector body in a close to or contact with a base portion of the sensor. Moreover, it is preferable that a cut portion is provided in the protector body such that an elastic deformation of the sensor which is caused by a collision of the sensor and the object elastically deforms the protector body and an amount of the elastic deformation of the protector body corresponding to an amount of the elastic deformation of the sensor is detected by the strain detector.

In the present invention, moreover, it is also preferable that the sensor should include a ring-shaped member provided in a suspending condition from an end of the projection member.

Herein, the ring-shaped member includes a continuous ring-shaped member, a ring-shaped member provided with a plurality of cut portions in the ring-shaped member and divided into a plurality of parts by the cut portions and the like.

In the present invention, furthermore, it is preferable that the sensor should have a tip portion bulged outward from a side surface portion of the moving member or a side surface portion of the protector body with a longitudinal direction thereof turned obliquely to a direction of movement of the moving member.

In the present invention, moreover, it is preferable that the sensor should be constituted to be plate-shaped and the strain detector should be provided in a base side surface portion of the plate-shaped sensor in which an elastic deformation is generated by a collision of a tip portion of the plate-shaped sensor and the object.

In the present invention, furthermore, it is preferable that the plated-shaped sensor should be constituted by a material which is greatly deformed elastically by a collision with the object. Examples of a material which is greatly deformed elastically by the collision with the object includes a resin such as polypropylene.

BEST MODE OF CARRYING OUT THE INVENTION

A preferred embodiment of the present invention will be described below with reference to the drawings.

Figure 1:
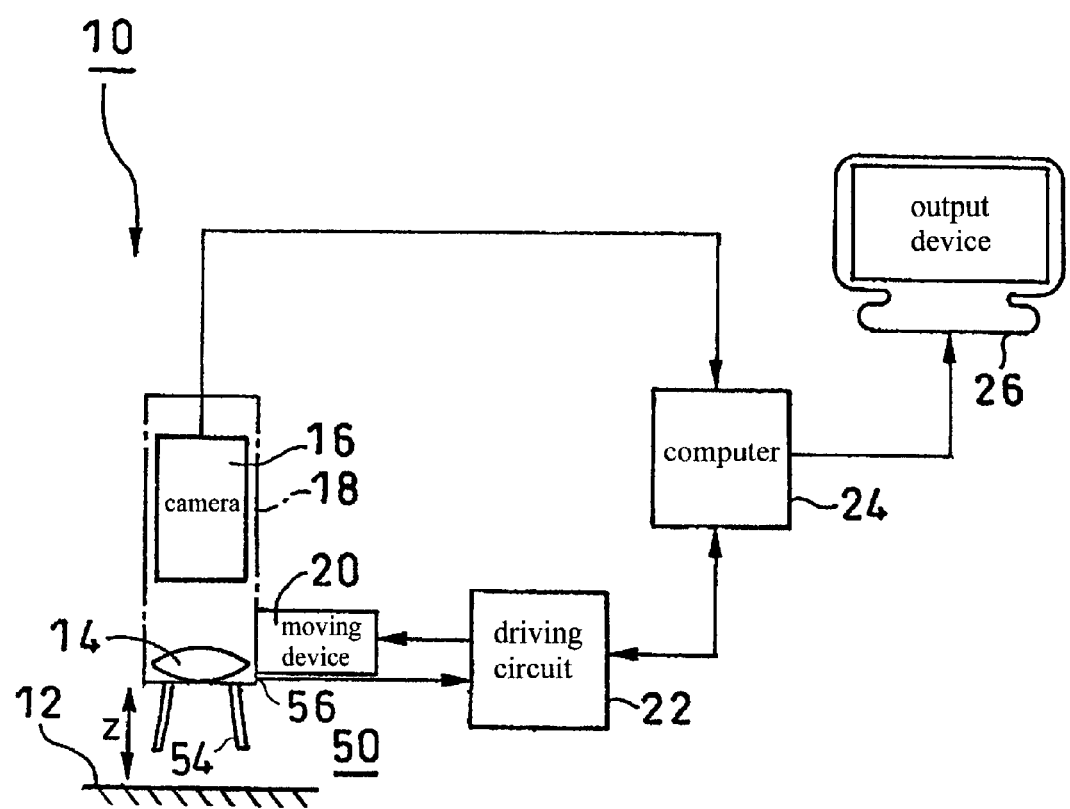
FIG. 1 is a diagram illustrating the schematic structure of a measuring apparatus according to an embodiment of the present invention.

FIG. 1 shows the schematic structure of a measuring apparatus according to an embodiment of the present invention. In the present embodiment, description will be given to an ample in which an image measuring apparatus is used for the measuring apparatus.

As shown in FIG. 1, an image measuring apparatus (a measuring apparatus) 10 according to the present embodiment comprises an image device (a moving member) 18 including an objective lens 14 and a CCD camera 16 which serve to measure the image of the scene of a measuring surface 12 of a workpiece (object) or the like and provided movably in the directions of X, Y and Z axes, a moving device 20 for moving the image device 18 including the objective lens 14 in the directions of the X, Y and Z axes, a driving circuit (controller) 22 for controlling the operation of the moving device 20, and a computer 24.

The objective lens 14 is moved in the direction of the Z axis by the moving device 20 through the driving circuit 22 in such a manner that the measuring surface 12 of the workpiece is placed in the focal position of the objective lens 14. Then, the image of the scene of the measuring surface 12 of the workpiece or the like is measured by the image device 18. A signal sent from the image device 18 is processed by the computer 24 and the image of the scene of the measuring surface 12 of the workpiece is output to an external output device 26.

By using the image measuring apparatus 10, the image of the scene of the measuring surface 12 of the workpiece can be obtained.

The image measuring apparatus 10 does not have a relief mechanism such as an over-travel mechanism of a touch probe in a three-dimensional measuring machine (CMM: Coordinate Measuring Machine), for example.

For this reason, in a general measuring apparatus, an objective lens is caused to collide with a workpiece or a jig due to an operational mistake or the mistake of a part program, for example, so that the objective lens and the measuring apparatus body are greatly damaged in some cases.

In a measuring apparatus combining the CCD camera 16 and a laser autofocus mechanism (not shown) for measuring a height stably and quickly by a focal point detecting method utilizing the CCD camera and a laser, the focal point is indispensably regulated for each objective lens. However, since the objective lens cannot be exchanged, some protector is required for a moving member such as the objective lens.

However, an illumination unit (not shown) such as a programmable ring light (PRL) is present around the objective lens 14, for example. Therefore, a clearance is hardly present.

For this reason, conventionally, it is actually hard to newly provide a general large-scaled protector for a recent measuring apparatus so that the development of any countermeasure for preventing a collision against the moving member has been required urgently.

Figure 2:
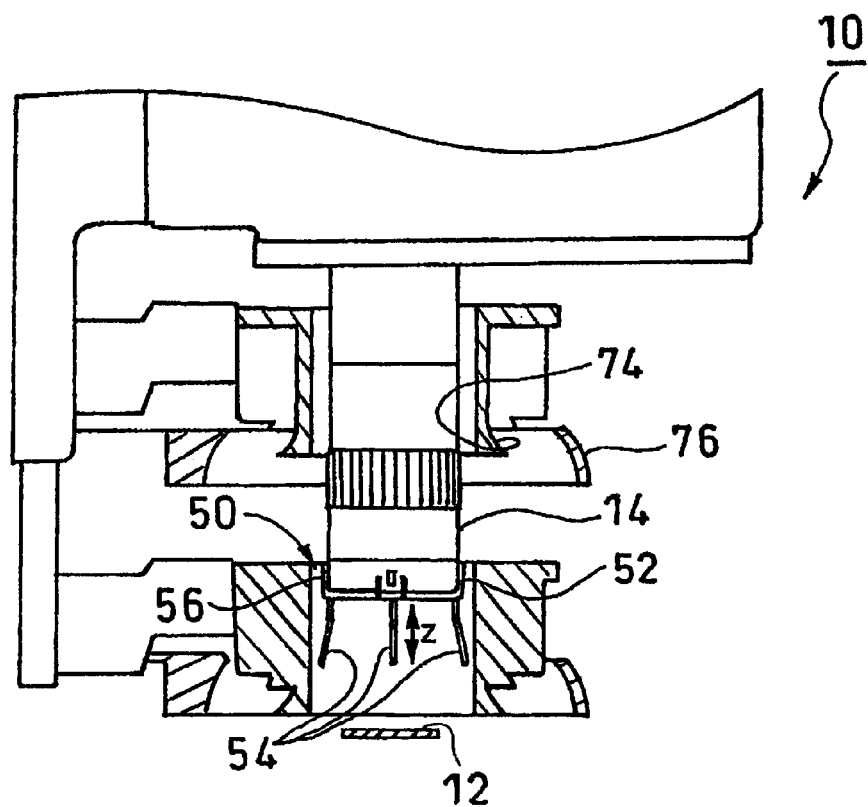
FIG. 2 is a view illustrating a state in which a protector according to the embodiment of the present invention is provided in the objective lens of the measuring apparatus according to the embodiment of the present invention.

The present invention is characterized in that the protector having an excellent reduction in a size and excellent space saving is provided in order to prevent the collision of the moving member. In the present embodiment, therefore, a protector 50 is attached to the tip of the objective lens 14 in the image measuring apparatus 10 as shown in FIG. 2.

Figure 3:
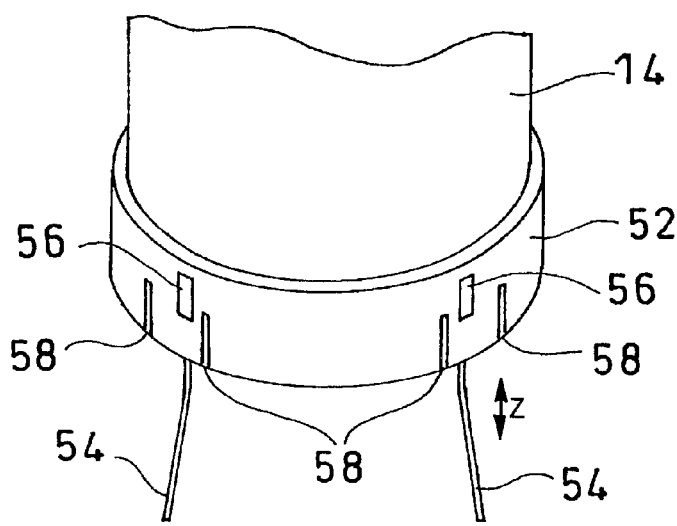
FIG. 3 is a view illustrating the schematic structure of the protector according to the embodiment of the present invention.
Figure 4:
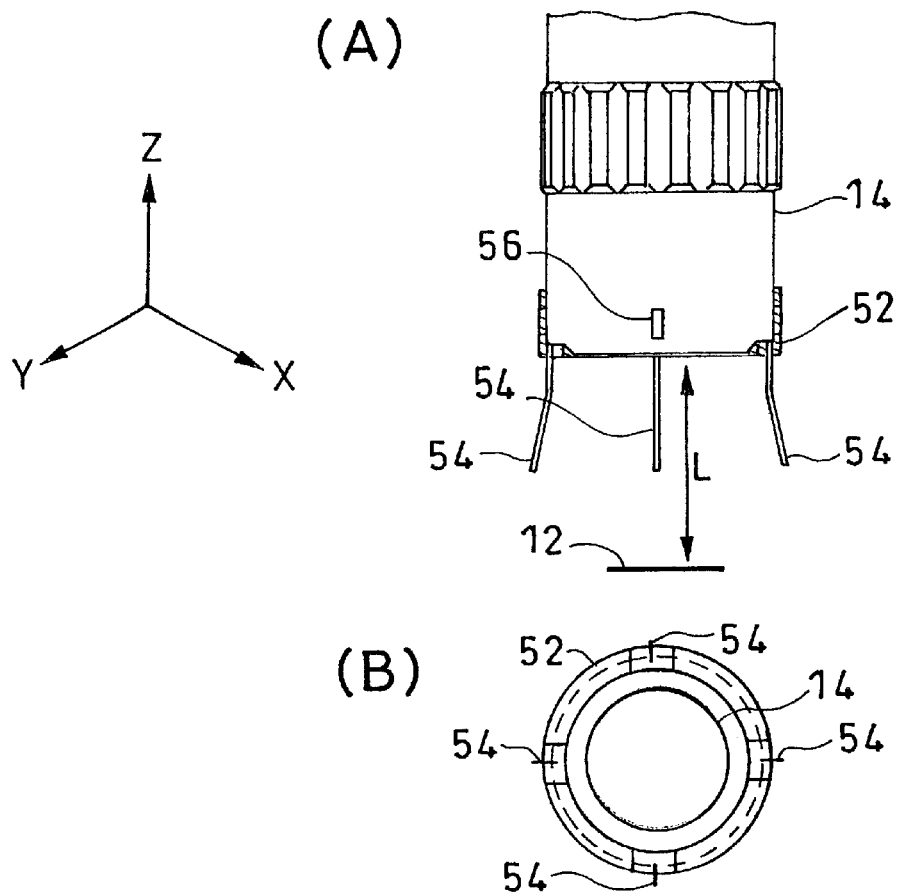
FIG. 4 is a view illustrating the schematic structure of the protector according to the embodiment of the present invention.

More specifically, the protector 50 comprises a protector body 52, a sensor (antenna) 54 and a strain gauge (a strain detector) 56 shown in FIGS. 3 and 4 in addition to the driving circuit 22 shown in FIG. 1. FIG. 3 is a perspective view showing the appearance of the periphery of the tip of the objective lens, FIG. 4(A) is a side view showing the periphery of the tip of the objective lens and FIG. 4(B) is a view showing the periphery of the tip of the objective lens seen from below.

The protector body 52 shown above is provided on the outer periphery of the tip of the objective lens 14, for example, an adjacent portion to the outer periphery. The protector body 52 is constituted such that a cut portion 58 in a longitudinal direction (the direction of the Z axis) is formed on both sides with the extended line of an each sensor 54 interposed therebetween so as to obtain an easy elastic deformation. Consequently, the sensor 54 is elastically deformed by a collision with an object so that the vicinity of the cut portion 58 of the protector body 52 is elastically deformed easily. In the present embodiment, thus, the amount of the elastic deformation of the sensor 54 can be grasped reliably by means of the strain gauge 56 through the elastic deformation of the protector body 52.

The sensor 54 is formed of a projection member, for example, and four projection members are provided apart from each other along the protector body 52 in the adjacent portion to the outer periphery of the objective lens 14.

The sensor 54 is provided to be protruded from the protector body 52 by a predetermined length to come in contact in such a manner that a distance between an object such as the measuring surface 12 of a workpiece and the protector body 52 has a predetermined value or less in order not to obstruct the measuring surface, and the contact with the object such as the workpiece gives the elastic deformation.

More specifically, in the present embodiment, the sensor 54 is much shorter than a focal distance L of the objective lens 14 and has such a predetermined length as to be protruded from the tip of the objective lens 14.

Moreover, the sensor 54 has a longitudinal direction thereof turned obliquely and outward, that is, in a centrifugal direction with respect to the optical axis of the objective lens 14 so as to be easily deformed against the collision in the direction of the Z axis.

Moreover, the sensor 54 has a tip portion thereof bulged outward from the external shape of the side wall (side surface portion) of the protector body 52 in order to rapidly detect the danger of a collision in the directions of the X and Y axes which are orthogonal to the Z axis.

In the present embodiment, thus, the middle portion of the sensor 54 is bent outward, for example, so that the tip portion of the sensor 54 is bulged outward from the external shape of the side wall of the protector body 52 in an outward warped condition from a base portion and the middle portion.

The strain gauge 56 is stuck to the vicinity of the cut portion 58 of the protector body 52 in a close or contact state with respect to the base portion of each sensor 54, and detects the amount of the elastic deformation of the vicinity of the cut portion 58 in the protector body 52 corresponding to the amount of the elastic deformation of the sensor 54 and outputs the same amount to the driving circuit 22, the computer 24 and the like, for example.

When the amount of the elastic deformation which is detected by the strain gauge 56 exceeds a predetermined amount, the driving circuit 22 stops the movement of the image device 18 including the objective lens 14 by the moving device 20 or sets the same movement in a reverse direction.

The image measuring apparatus 10 according to the present embodiment is schematically constituted as described above and the function thereof will be described below.

In the present embodiment, first of all, the driving circuit 22 causes the moving device 20 to move the objective lens 14 of the image device 18 in the direction of the Z axis, for example, in such a manner that the measuring surface 12 of the workpiece is placed in the focal position of the objective lens 14. Then, the scene of the measuring surface 12 of the workpiece or the like is measured by the image device 18.

The present invention is characterized in that the protector having an excellent reduction in a size and excellent space saving is provided in the moving member such as the objective lens. In the present embodiment, therefore, the protector 50 comprises the protector body 52, the sensor 54 and the strain gauge 56.

The sensor 54 includes a projecting member, for example, and four projection members are provided apart from each other along the protector body 52 in the adjacent portion to the outer periphery of the objective lens 14. Moreover, the sensor 54 is protruded with a longitudinal direction thereof turned obliquely and outward so as to be easily deformed against the collision in the direction of the Z axis.

Figure 5:
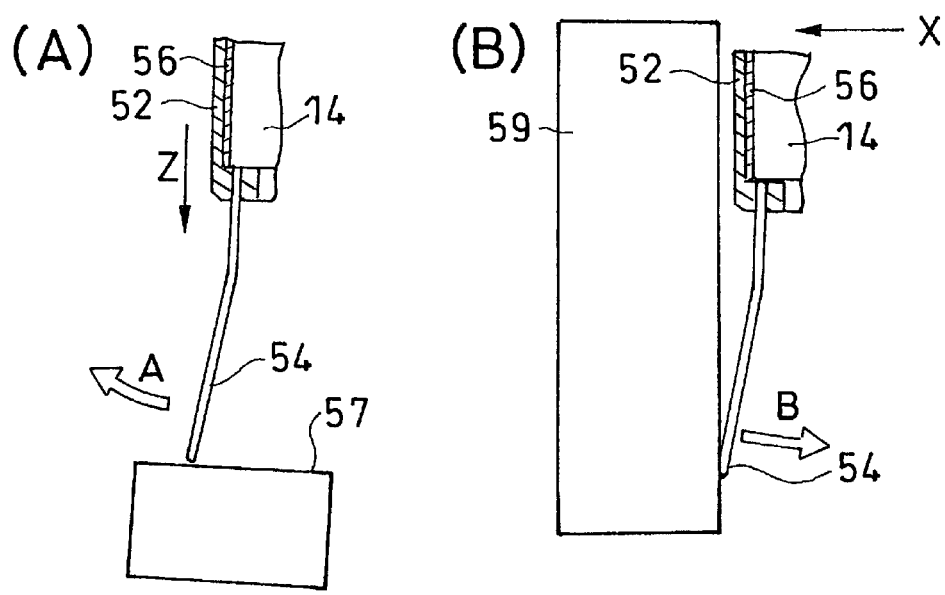
FIG. 5 is a view illustrating the function of the protector according to the present embodiment.

As a result, in the present embodiment, when the objective lens 14 is brought downward in the direction of the Z axis so that the tip of the sensor 54 hits on an object 57 such as the workpiece prior to the objective lens 14 as shown in FIG. 5(A), for example, the sensor 54 is first deformed in a direction of an arrow A in the drawing. The deformation elastically deforms the vicinity of the cut portion 58 of the protector body 52. The elastic deformation of the protector body 52 is transmitted to the strain gauge 56. When a change of a predetermined amount or more is detected over the resistance value of the strain gauge 56, the driving circuit 22 or the like decides that there is a danger of a collision with the object 57. Consequently, the driving circuit 22 takes any countermeasure against a collision before the objective lens 14 comes in contact with the object 57.

The driving circuit 22 stops the image measuring apparatus 10, and stops the movement of the image device 18 such as the objective lens 14 by the moving device 20, for example. Alternatively, the driving circuit 22 moves the objective lens 14 upward in the direction of the Z axis (a reverse direction) by the moving device 20 based on information indicative of the direction of the movement to the moving device 20 (downward in the direction of the Z axis) when the danger of the collision is sensed.

In the present embodiment, moreover, the sensor 54 has a tip thereof bulged outward from the external shape of the side wall of the protector body 52 in the protector 50 with a longitudinal direction thereof turned obliquely to the direction of the Z axis in order to rapidly detect the danger of the collision in the directions of the X and Y axes.

As a result, in the present embodiment, when the objective lens 14 is moved leftward in the direction of the X axis and the tip of the sensor 54 hits on an object 59 prior to the objective lens 14 as shown in FIG. 5(B), for example, the sensor 54 is first deformed in a direction of an arrow B in the drawing. The deformation elastically deforms the vicinity of the cut portion 58 of the protector body 52. The elastic deformation of the protector body 52 is transmitted to the strain gauge 56 so that the resistance value of the strain gauge 56 is changed. When a change of a predetermined amount or more is detected over the resistance value of the strain gauge 56, the driving circuit 22 or the like decides that there is a danger of a collision with the object 59. Consequently, the driving circuit 22 takes any countermeasure against the collision before the objective lens 14 comes in contact with the object 59.

The driving circuit 22 stops the image measuring apparatus 10, and stops the movement of the image device 18 such as the objective lens 14 by the moving device 20, for example. Alternatively, the driving circuit 22 moves the objective lens 14 rightward in the direction of the X axis (reverse direction) by the moving device 20 based on information indicative of the direction of movement to the moving device 20 (leftward in the direction of the X axis) when the danger of the collision is sensed.

In the present embodiment, thus, the danger of the collision is sensed by the sensor 54, the protector body 52, the strain gauge 56, the driving circuit 22 and the like before the objective lens 14 collides with an object such as the workpiece, and the image measuring apparatus 10 is stopped or the moving member such as the objective lens 14 is moved in the reverse direction. Therefore, the moving member such as the objective lens 14 can be reliably prevented from colliding with the objects 57 and 59. In other words, it is possible to prevent the moving member from colliding with the object during the movement in the directions of the X, Y and Z axes of the moving member such as the objective lens 14. In the present embodiment, consequently, it is possible to reliably protect the moving member such as the objective lens 14, the image measuring apparatus 10, the workpiece and the like from a breakage caused by the collision.

In addition, in the present embodiment, the sensor 54, the strain gauge 56 and the like which are small-sized are used as the protector 50. Therefore, it is possible to easily provide the protector 50 on the periphery of the moving member such as the objective lens 14 in the image measuring apparatus 10 in which a clearance is hardly present.

While a piezoelectric element or the like can be used as the strain detector, it is more preferable to use the strain gauge 56 which is small-sized and has a wide application range in the present embodiment.

In the present embodiment, moreover, the tip portion of the sensor 54 may be warped inward in such a range as not to enter the field of view of the objective lens 14 in consideration of only the sensing for a danger of a collision during the movement of the moving member in the direction of the Z axis. In other words, the longitudinal direction of the sensor 54 may be turned in a centripetal direction which is opposite to the centrifugal direction.

In the case in which the rapid sensing for the danger of the collision in the directions of the X and Y axes is also supposed, however, the tip portion of the sensor 54 which is warped outward as compared with an inward warpage is particularly preferable in respect of the rapid sensing for the danger of the collision in the directions of the X and Y axes.

In the present embodiment, it is particularly preferable that the tip portion of the sensor 54 should be bulged outward from the external shape of the side wall of the protector body 52 in the protector 50 in consideration of more reliable sensing for the danger of the collision in the directions of the X and Y axes in addition to the sensing for the danger of the collision in the direction of the Z axis as described above. In the present embodiment, consequently, the danger of the collision in the directions of the X and Y axes can reliably be sensed in addition to the sensing for the danger of the collision in the direction of the Z axis.

Moreover, while the example in which the sensor 54 is constituted by four projection members has been described for the structure, it is preferable that the number of the sensors 54 should be increased if there is no influence on an oblique illumination from a side, for example, a ring light. Consequently, a detecting capability can be enhanced.

Figure 6:
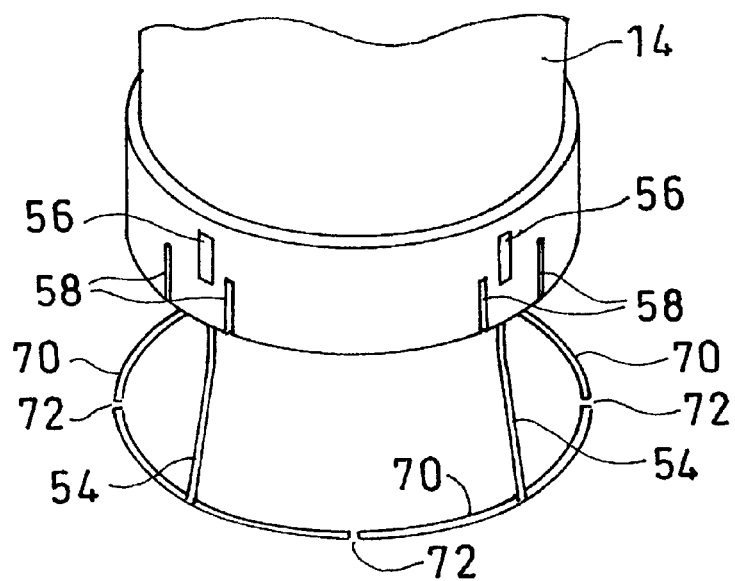
FIG. 6 is a view illustrating the schematic structure of a protector according to a second embodiment of the present invention.

Furthermore, if the shape of the sensor 54 is elastically deformed by the collision on the object such as the workpiece, an optional shape can be employed. For example, in the present invention, it is also suitable that the sensor 54 should include a ring-shaped member provided in a suspending condition from the projection member. In the present embodiment, therefore, a ring-shaped member 70 is provided in the tip portion of the sensor 54 as shown in FIG. 6. Consequently, there is a higher possibility that the ring-shaped member 70 should come in contact with the object as compared with only the projection member. As compared with only the projection member, therefore, it is possible to increase a region in which the danger of a collision can be detected.

It can also be supposed that the sensor 54 is deformed with difficulty by a contact with an object during the movement of the moving member in the direction of the Z axis if a continuous ring-shaped member is provided.

In the present embodiment, it is also suitable that a plurality of cut portions should be provided on the ring-shaped member and the ring-shaped member should be divided into a plurality of parts by the cut portions. In the present embodiment, therefore, the ring-shaped member is cut in several portions as shown in FIG. 6 and a plurality of cut portions 72 are provided to obtain the ring-shaped member 70. Consequently, the region in which the danger of a collision can be detected is increased by the ring-shaped member 70 as described above, and furthermore, the sensor 54 can be deformed more easily by the ring-shaped member 70 having the parts cut in several portions as compared with the continuous ring-shaped member. Consequently, the danger of the collision can be detected rapidly.

In the present embodiment, moreover, also when the ring-shaped member 70 is provided on the tip of the projection member as described above, it is particularly preferable that the outer peripheral edge portion of the ring-shaped member 70 should be bulged outward from the external shape of the side wall of the protector body 52 in the protector 50 in consideration of the sensing for the danger of the collision in the directions of the X and Y axes in addition to the sensing for the danger of the collision in the direction of the Z axis in the same manner as in the case in which only the projection member is provided. In the present embodiment, consequently, also in the case in which the ring-shaped member 70 is used, the danger of the collision in the directions of the X and Y axes can reliably be sensed in addition to the sensing for the danger of the collision in the direction of the Z axis.

While the example in which the protector according to the present invention is attached to the objective lens to be used for the CCD camera of the image measuring apparatus has been described in each of the structures, moreover, it is also possible to attach the protector to any moving member of the measuring apparatus or the moving member of another machine.

For example, in an image measuring apparatus, an illumination unit provided like a ring on the outer periphery of the objective lens is mounted in addition to a vertical reflected illumination unit. For example, a fiber-optic circular illumination unit, a programmable ring light unit or the like is mounted as the illumination unit. The measuring apparatus comprising such an illumination unit mounts a toroid mirror 74, a parabola mirror 76 or the like for controlling the irradiation angle, direction and the like of illumination light on the measuring surface of the workpiece by the movement in the direction of the Z axis along the outer periphery of the objective lens (see FIG. 2 and the like). The protector according to the present invention can be attached to a portion of the toroid mirror 74, the parabola mirror 76 or the like in which the collision of the moving member is to be avoided.

In the present embodiment, accordingly, it is possible to provide the protector 50 using the sensor 54, the protector body 52, the strain gauge 56 and the like which are small-sized also on the periphery of the moving member such as the toroid mirror 74, the parabola mirror 76 and the like in which a clearance is hardly present. In the present embodiment, consequently, the sensor 54 hits on the object such as the workpiece prior to the toroid mirror 74, the parabola mirror 76 or the like so that the strain gauge 56 of the protector body can sense an approach to the object. In the present embodiment, thus, it is possible to stop the measuring apparatus 10 or to take a countermeasure for avoiding a collision, for example, the movement of the moving member in a reverse direction before the moving member such as the toroid mirror 74, the parabola mirror 76 or the like comes in contact with the object such as the workpiece. Therefore, it is possible to reliably protect the moving member from a breakage caused by the collision.

Figure 7:
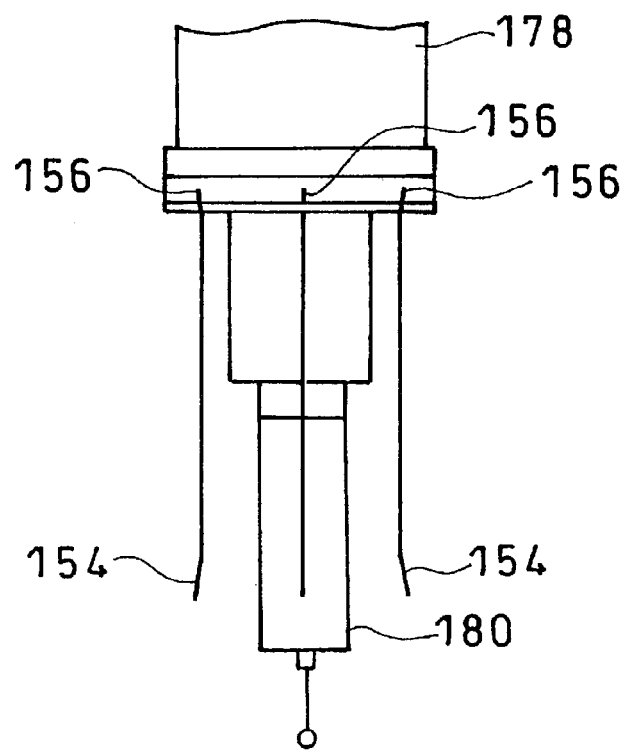
FIG. 7 is a view illustrating a state in which the protector according to the present embodiment is provided in a moving member other than the objective lens of an image measuring apparatus.

As shown in FIG. 7, moreover, the present embodiment can also be applied to protect a Z spindle such as a three-dimensional measuring machine (CMM). Portions corresponding to the above-mentioned structure are indicated as the reference numeral having 100 added thereto and description will be omitted.

More specifically, as shown in FIG. 7, a sensor 154 includes a plurality of, for example, four projection members provided apart from each other on the lower end of a Z spindle 178.

The sensor 154 is much shorter than the tip of a touch probe 180 in order not to obstruct the measurement of a contact with a measuring surface of a workpiece in the touch probe 180, and has such a predetermined length as to be protruded from the tip of the Z spindle 178.

Accordingly, a protector using the sensor 154, a strain gauge 156 and the like which are small-sized can also be provided on the periphery of the Z spindle 178 in which a clearance is hardly present. In the present embodiment, therefore, the sensor 154 hits on the object prior to the Z spindle 178 so that the strain gauge 156 provided on the base of the sensor 154 senses a contact with the object. Consequently, the driving circuit stops the measuring apparatus or takes a countermeasure for avoiding a collision, for example, the movement of a moving member in a reverse direction before the Z spindle 178 comes in contact with the object. Thus, it is possible to reliably protect the Z spindle 178 and the measuring apparatus from a breakage caused by the collision.

Figure 8:
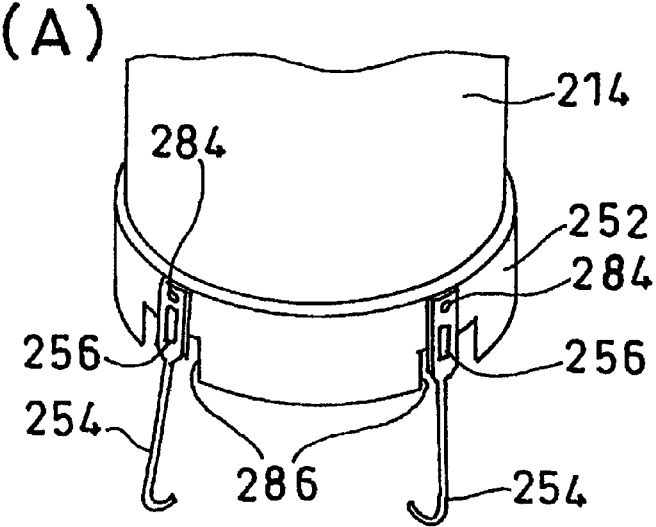
FIG. 8 is a view showing a variant of the protector according to the present embodiment.
Figure 8:
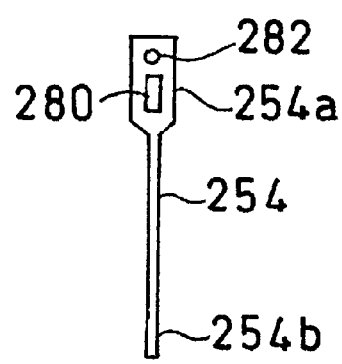
Figure 8:
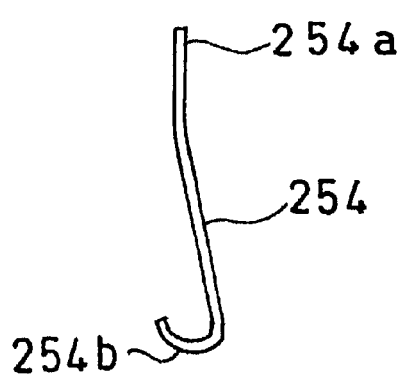

While the example in which the vicinity of the cut portion 58 of a protector body is elastically deformed by the elastic deformation of the sensor which is caused by the collision with the object and the strain gauge of the protector body detects the amount of the elastic deformation has been described in the structure, furthermore, it is also suitable that the sensor should have the function of the cut portion of the protector body in the embodiment as shown in FIG. 8. FIG. 8(A) is a perspective view showing the schematic structure of a protector according to a variant of the embodiment, FIG. 8(B) is a front view showing the sensor illustrated in FIG. 8(A) and FIG. 8(C) is a side view showing the sensor, and portions corresponding to the embodiment are indicated as the reference numerals having 200 added thereto and description will be omitted.

As shown in FIG. 8, the sensor 254 is constituted to be plate-shaped such that it can easily be deformed elastically at time of a contact with the object.

The sensor 254 has a base side surface portion 254a constituted more widely than a tip side surface portion 254b. Consequently, an elastic deformation is easily generated on the base side surface portion 254a of the sensor 254 such that an elastic deformation having a predetermined amount or more is detected by the contact of the tip of the sensor 254 with the object.

In the present embodiment, thus, the base side surface portion 254a of the sensor 254 is used in place of the cut portion of the protector body according to the embodiment.

A strain gauge sticking portion 280 is provided in the base side surface portion 254a of the sensor 254 and the strain gauge 256 is directly stuck to the strain gauge sticking portion 280.

A fixed hole 282 is provided above the strain gauge sticking portion 280 of the sensor 254 and a screw 284 is provided in the fixed hole 282 to fix the base side surface portion 254a of the sensor 254 to the protector body 252.

Moreover, the sensor 254 is wholly warped outward and the tip side surface portion 254b is curled with a radius of approximately 2 to 3 mm, for example, on the inside within such a range as not to enter the field of view of the objective lens 214. Consequently, the sensor 254 is so constituted as to be elastically deformed easily at time of a contact with the object.

Furthermore, a nick portion 286 is provided under the portion of the protector body 252 in which each sensor 254 is to be attached in order to reduce an impediment in the deformation of the sensor 254 by a contact with the protector body 252 when the sensor 254 comes in contact with the object.

In the present embodiment, thus, the sensor 254 is constituted to be plate-shaped and a strain gauge 256 is directly provided in the base side surface portion 254a of the plate-shaped sensor 254. In the present embodiment, consequently, it is possible to reliably detect the danger of the collision of the moving member by the sensor 254 in the same manner as in the use of the sensor 54 and the strain gauge 56 in the embodiment.

In the present embodiment, furthermore, the sensor 254 has the function of the cut portion of the protector body according to the embodiment, and the strain gauge 256 is directly provided in the base side surface portion 254a. As compared with the embodiment in which the strain gauge is provided in the protector body in place of the sensor, therefore, it is possible to further increase a sensitivity and simplify a structure for strain detection by the strain gauge 256.

It is preferable that metal such as phosphor bronze or beryllium copper (beryllium bronze) for a spring which is easily deformed elastically by a collision with an object should be used for the material of the plate-shaped sensor 254, for example. Moreover, it is more preferable that a material having a greater elastic deformation, for example, a resin such as polypropylene should be used if the use of the metal for the material of the sensor 254 gives a comparatively small elastic deformation and there is an anxiety for an excessive deformation.

While there has been described, in each of the embodiment, the example in which the objective lens of the CCD camera is assumed as the moving member and the movement in the direction of the Z axis for focusing is carried out by substantially moving only the objective lens in the direction of the Z axis without the movement of the CCD camera, moreover, it is possible to move the objective lens together with the CCD camera in the direction of the Z axis, and furthermore, in the directions of the X and Y directions, for example, except for the movement for focusing. In other words, it is possible to move components without moving the image device or to move the image device itself.

Moreover, while there has been described, in each of the structures, the example in which whether the amount of the deformation detected by the strain detector exceeds a predetermined amount is mainly decided by the driving circuit, the decision may be carried out by another member, for example, a computer or the like.

As described above, the measuring apparatus in accordance with the present invention comprises a protector body provided in a moving member, a sensor protruded from the protector body by a predetermined length and deformed elastically by a contact with an object, a strain detector for detecting the amount of an elastic deformation of the sensor, and a controller for stopping the movement of the moving member by the moving device or setting the same movement in a reverse direction when the amount of the deformation detected by the strain detector exceeds a predetermined amount. As a result, in the present invention, it is possible to reliably prevent the collision of the moving member in the measuring apparatus.

In the present invention, moreover, the sensor is shorter than the focal length of the objective lens in the image device and has such a predetermined length as to be protruded from the tip of the objective lens. Consequently, it is possible to reliably prevent the collision of the objective lens in the image device of the image measuring apparatus.

In the present invention, furthermore, the sensor includes a plurality of projection members provided apart from each other along the outer periphery of the objective lens. Consequently, it is possible to more reliably detect the danger of the collision of the moving member by the sensor. In the present invention, moreover, the sensor includes a ring-shaped member provided in a suspending condition from the projection member. Consequently, it is possible to more reliably detect the danger of the collision of the moving member by the sensor. In the present invention, furthermore, a plurality of cut portions are provided in the ring-shaped member and are so constituted as to be deformed at time of a contact with the object. Consequently, it is possible to more reliably detect the danger of the collision of the moving member by the sensor.

In the present invention, furthermore, the sensor has a tip thereof bulged outward from the side wall of the moving member with a longitudinal direction thereof turned obliquely to the direction of the movement of the moving member. Consequently, it is also possible to rapidly sense the danger of a collision at time of the movement in the direction of the side wall of the moving member in addition to the sensing for the danger of a collision during the movement in the direction of the projection of the sensor.

In the present invention, moreover, the sensor is constituted to be plate-shaped and a strain detector is directly provided in the base side surface portion of the plate-shaped sensor. Consequently, it is possible to further increase a sensitivity in strain detection to be carried out by the strain detector and simplify the structure of the protector.

What is claimed is:

1. A measuring apparatus comprising:
   a moving member which is moved to obtain information about a workpiece and might collide with a certain object;
   a moving device for moving the moving member; and a protector for preventing the moving member from colliding with the object, the protector including:

a protector body secured to the moving member and disposed in a position wherein the protector body will contact the object prior to a collision between the moving member and the object;

a sensor protruded from the protector body by a predetermined length to come in contact such that a distance between the object and the protector body has a predetermined value or less and deformed elastically by a contact with the object;

a strain detector for detecting an amount of an elastic deformation of the sensor; and a controller for stopping the movement of the moving member by the moving device or setting the same movement in a reverse direction when the amount of the elastic deformation detected by the strain detector exceeds a predetermined amount.

2. The measuring apparatus according to claim 1, further comprising an image device including an objective lens as the moving member and serving to measure an image of a measuring surface of the workpiece through the objective lens, the moving device moves at least the objective lens of the image device in a direction of an optical axis thereof, the controller moves at least the objective lens by the moving device such that the measuring surface of the workpiece is placed in a focal position of the objective lens, and the sensor is shorter than the focal length of the objective lens and has such a predetermined length as to be protruded from a tip of the objective lens.

3. The measuring apparatus according to claim 2, wherein the sensor includes a plurality of projection members provided apart from each other along an outer periphery of the objective lens.

4. The measuring apparatus according to claim 1, wherein the strain detector is provided in the protector body in a close to or contact with a base portion of the sensor, and a cut portion is provided in the protector body such that an elastic deformation of the sensor which is caused by a collision of the sensor and the object elastically deforms the protector body and an amount of the elastic deformation of the protector body corresponding to an amount of the elastic deformation of the sensor is detected by the strain detector.

5. The measuring apparatus according to claim 3, wherein the sensor includes a ring-shaped member provided in a suspending condition from an end of the projection member.

6. The measuring apparatus according to claim 5, wherein the ring-shaped member is provided with a plurality of cut portions and is divided into a plurality of parts by the cut portions.

7. The measuring apparatus according to claim 1, wherein the sensor has a tip portion bulged outward from a side surface portion of the moving member or a side surface portion of the protector body with a longitudinal direction thereof turned obliquely to a direction of movement of the moving member.

8. The measuring apparatus according to claim 1, wherein the sensor is constituted to be plate-shaped and the strain detector is provided in a base side surface portion of the plate-shaped sensor in which an elastic deformation is generated by a collision of a tip portion of the plate-shaped sensor and the object.

9. The measuring apparatus according to claim 8, wherein the plated-shaped sensor is constituted by a material which is greatly deformed elastically by a collision with the object.

10. The measuring apparatus according to claim 9, wherein a material which is greatly deformed elastically by the collision with the object is polypropylene.

11. The measuring apparatus of claim 1, wherein the moving member includes an objective lens to measure an image of an object.

12. The measuring device of claim 11 wherein the moving member further includes a CCD camera.

* * * * *